United States Patent [19]

Altmann et al.

[11] Patent Number: 5,542,399
[45] Date of Patent: Aug. 6, 1996

[54] METHOD CONTROLLING AN INTERNAL COMBUSTION ENGINE

[75] Inventors: Uwe Altmann, Schwieberdingen; Hermann Grieshaber, Aichtal, both of Germany

[73] Assignee: Robert Bosch GmbH, Stuttgart, Germany

[21] Appl. No.: 340,690

[22] Filed: Nov. 16, 1994

[30] Foreign Application Priority Data

Dec. 23, 1993 [DE] Germany ............................ 43 44 138.6

[51] Int. Cl.⁶ ........................................... F02B 29/04
[52] U.S. Cl. ............................................. 123/563; 60/599
[58] Field of Search ............................... 60/599; 123/563

[56] References Cited

U.S. PATENT DOCUMENTS 3,921,403  11/1975  McInerny et al. ................... 60/599
5,201,285   4/1993  McTaggart .

FOREIGN PATENT DOCUMENTS

| 369148 | 5/1990 | European Pat. Off. . |
| 0496085 | 7/1992 | European Pat. Off. . |
| 2231254 | 1/1974 | Germany . |
| 3104124 | 9/1982 | Germany ............................... 123/563 |
| 3838404 | 5/1990 | Germany . |
| 52-52018 | 4/1977 | Japan ..................................... 60/599 |
| 60-135625 | 7/1985 | Japan ..................................... 60/599 |
| 62-29719 | 2/1987 | Japan ..................................... 123/563 |
| 2-286826 | 11/1990 | Japan ..................................... 123/563 |

*Primary Examiner*—Michael Koczo
*Attorney, Agent, or Firm*—Kenyon & Kenyon

[57] ABSTRACT

A method for controlling an internal combustion engine, in particular a diesel internal combustion engine, having a fan for cooling at least the supercharger air, includes a drive device which drives the fan. The drive device can be controlled and/or regulated as a function of operating parameters of the internal combustion engine.

10 Claims, 3 Drawing Sheets

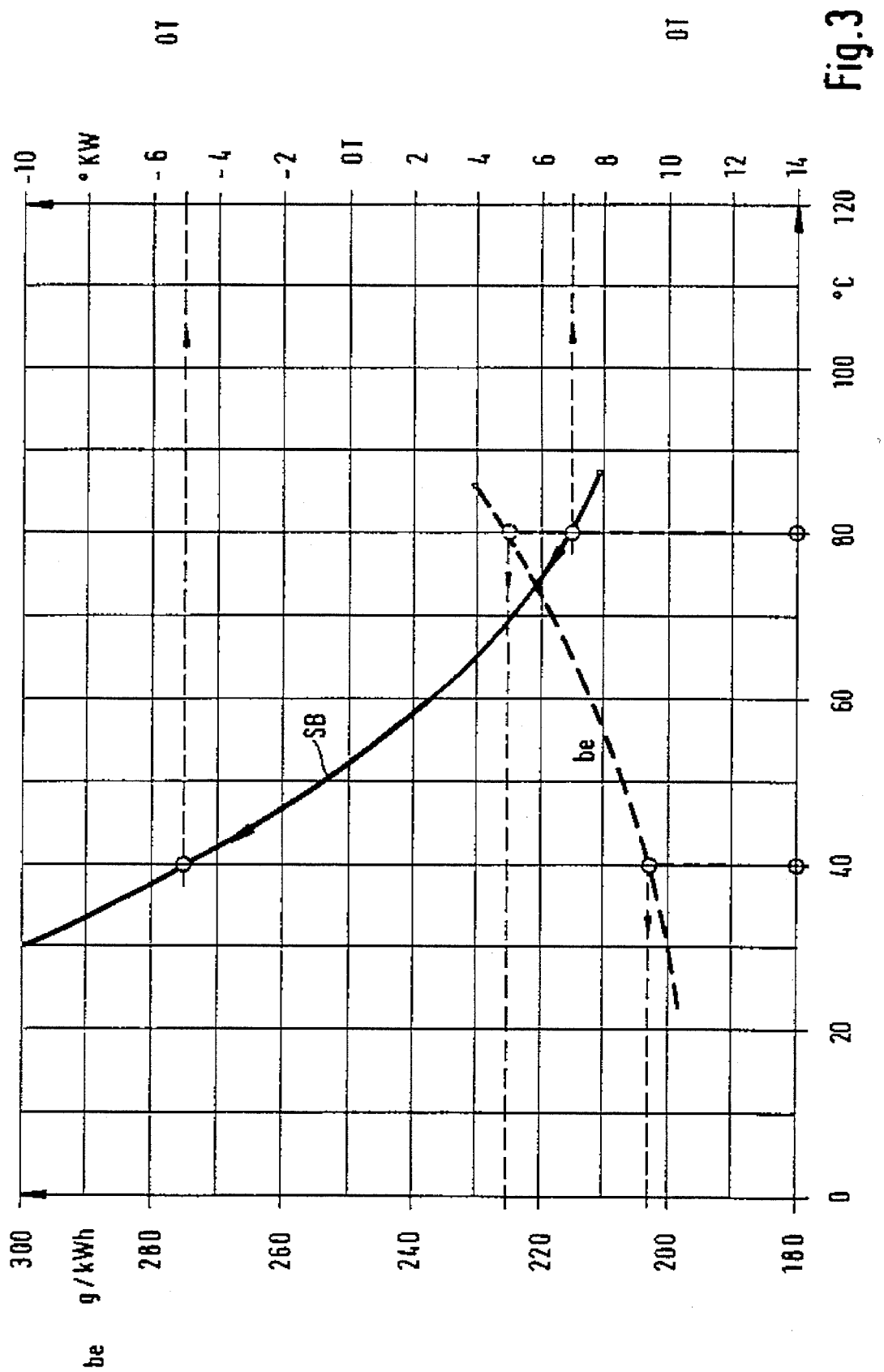

METHOD CONTROLLING AN INTERNAL COMBUSTION ENGINE

FIELD OF THE INVENTION

The present invention relates to a method for controlling an internal combustion engine. More particularly, the method for controlling an internal combustion engine according to the present invention relates to a diesel internal combustion engine which includes a fan for cooling the supercharger air and is used, for example, in commercial motor vehicles such as buses.

BACKGROUND OF THE INVENTION

German Patent Application No. DE 38 38 404 describes a control device for the drive of a fan of an internal combustion engine which is used to cool the supercharger air.

An object of the present invention is to decrease the fuel consumption and the exhaust emission in a method and device for controlling an internal combustion engine.

SUMMARY OF THE INVENTION

According to the method of the present invention, the fuel consumption and exhaust emission of an internal combustion engine can be decreased without decreasing driving performance.

BRIEF DESCRIPTION OF THE DRAWINGS

FIG. 3 shows the relationship between the temperature of the supercharger air and the consumption of fuel, and the permissible displacement of the start of injection according to the present invention.

DETAILED DESCRIPTION OF THE INVENTION

Figure 1:
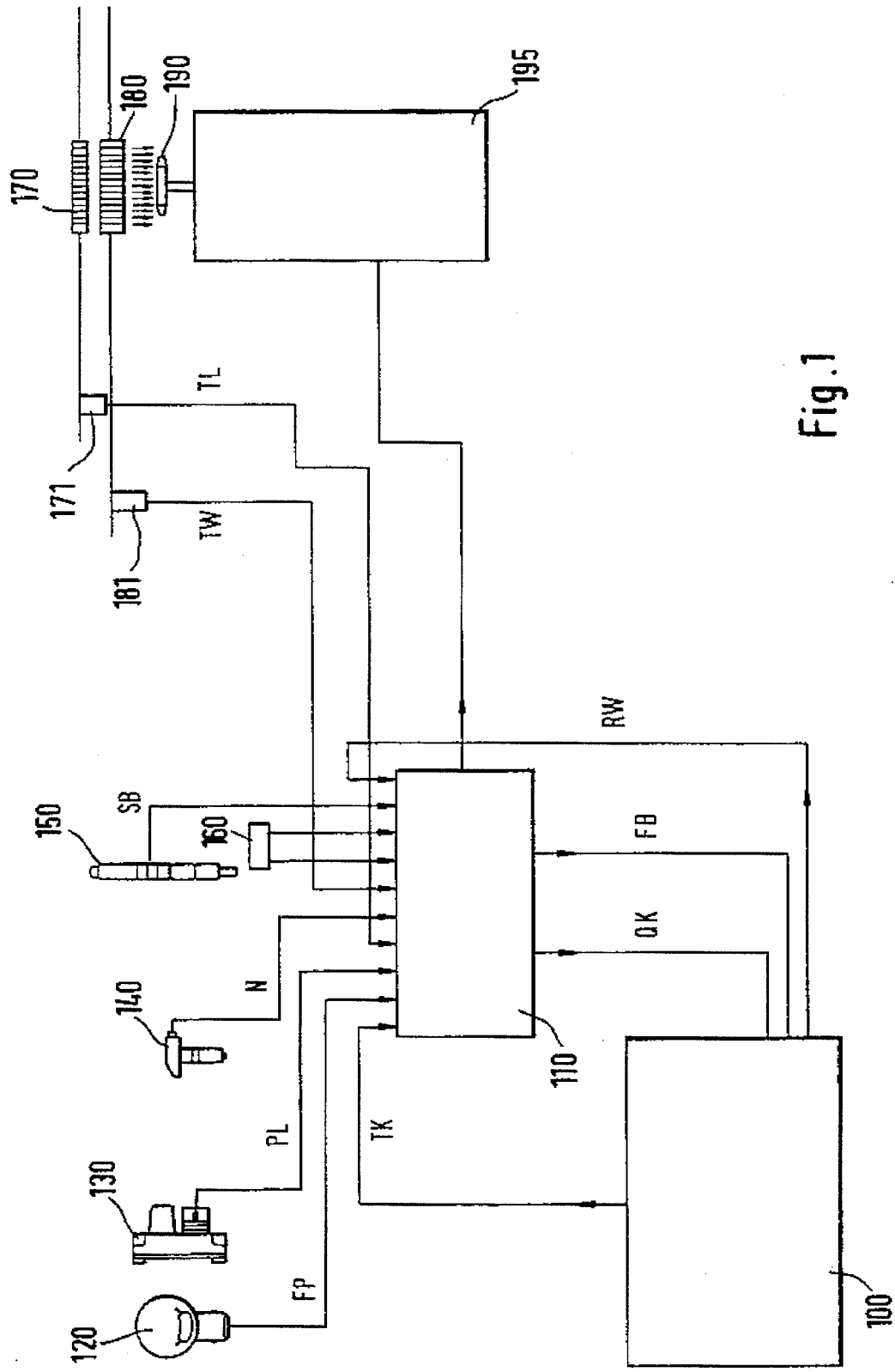
FIG. 1 shows a block diagram of the device according to the present invention for controlling an internal combustion engine.

FIG. 1 shows the device according to the present invention in the form of a block diagram. A fuel-metering device is designated 100. This fuel-metering device is customarily also referred to as a fuel pump. Distributor pumps, series pumps, solenoid-controlled pumps or other types of pumps can be used as a fuel pump.

The fuel-metering device 100 is in communication, via various lines, with a control unit 110, which can also be referred to as an engine control unit. Thus, the control unit 110 acts by a quantity signal QK on an actuator for controlling the amount of fuel, and by a delivery start signal FB on an actuator for controlling the start of the feed. Furthermore, a signal RW concerning the amount of fuel injected and the temperature of the fuel TK passes from the fuel-metering device 100 to the control unit 110.

The control unit 110 processes signals from different sensors. These signals include, among others, the output signal FP of a sensor 120 which indicates the position of the accelerator pedal, the output signal PL of a supercharger pressure sensor 130, the output signal N of a speed-of-rotation sensor 140, the output signal SB of a start-of-injection sensor 150, and signals from additional sensors 160.

The supercharger air passes through a cooler 170. The temperature TL of the supercharger air is detected by a supercharger-air temperature sensor 171 and transmitted to the control unit 110. Another cooler 180 is passed through by the cooling liquid. The temperature TW of the cooling liquid is detected by a sensor 181 and a corresponding signal is fed to the control unit 110.

The two coolers 170 and 180, which can also form a single structural unit, are cooled with air from a fan 190. The fan 190 is driven by a drive unit 195. This drive unit is acted on by a signal from the control unit 110.

In one embodiment of the present invention, a separate control unit can also be provided which controls the drive unit 195 based on a signal from the control unit 110. Such a separate control unit can be referred to as a fan control unit. It, for instance, converts the signals transmitted by the engine control unit 110 into control values for the fan drive 195.

The device according to the present invention operates as follows. Based on the output signals of the different sensors, the control unit 110 calculates control signals for application to different actuators of the fuel-metering device. In particular, the control unit 110 calculates an amount of fuel to be fed, and a start of feed and/or start of injection. Depending on the type of pump used, different components are used as an actuator.

Furthermore, the control unit 110 acts on the drive unit 195 of the fan 190 by means of a control signal. For this, the output signals of the different sensors 120, 130, 140, 150 and 160 are also taken into account.

The drive unit 195 of the fan 190 is controlled or regulated as a function of operating parameters. In particular, this control, which is dependent on operating parameters, takes place as a function of a load signal.

As load signal L, the output signal FP of the accelerator-pedal position sensor 120, the signal RW concerning the amount of fuel injected which is sent back by the fuel-metering device, a signal present internally in the control unit 110 concerning the amount of fuel to be injected, the control signal QK for the fuel quantity actuator, or some other corresponding value can be used.

The drive unit 195 is controlled as a function of these load signals. This control can take place in the manner that with low loads, a high temperature of the supercharger air is established, and with high loads, a low temperature of the supercharger air is established.

In another embodiment of the present invention, the drive unit includes a fixed-displacement pump which conveys a volumetric stream to a fixed-displacement motor. The pre-controlled proportional pressure valve which is connected and bypassed to the fixed-displacement motor controls the pressure and the speed of rotation of the fixed-displacement motor and/or the fanwheel respectively. Such a device is described in German Patent Application No. OS 38 38 404.

The current of the proportional magnet on the pressure control valve is controlled in accordance with the state of the load of the internal combustion engine. With a current close to zero, the pressure control valve is closed and the volumetric flow from the fixed-displacement pump flows to the fixed-displacement motor. A maximum speed of rotation is established on the fixed-displacement motor and/or the fan, the maximum speed being dependent on the hydraulic transmission ratio between the pump and the motor, and the speed of rotation of the internal combustion engine.

Figure 2:
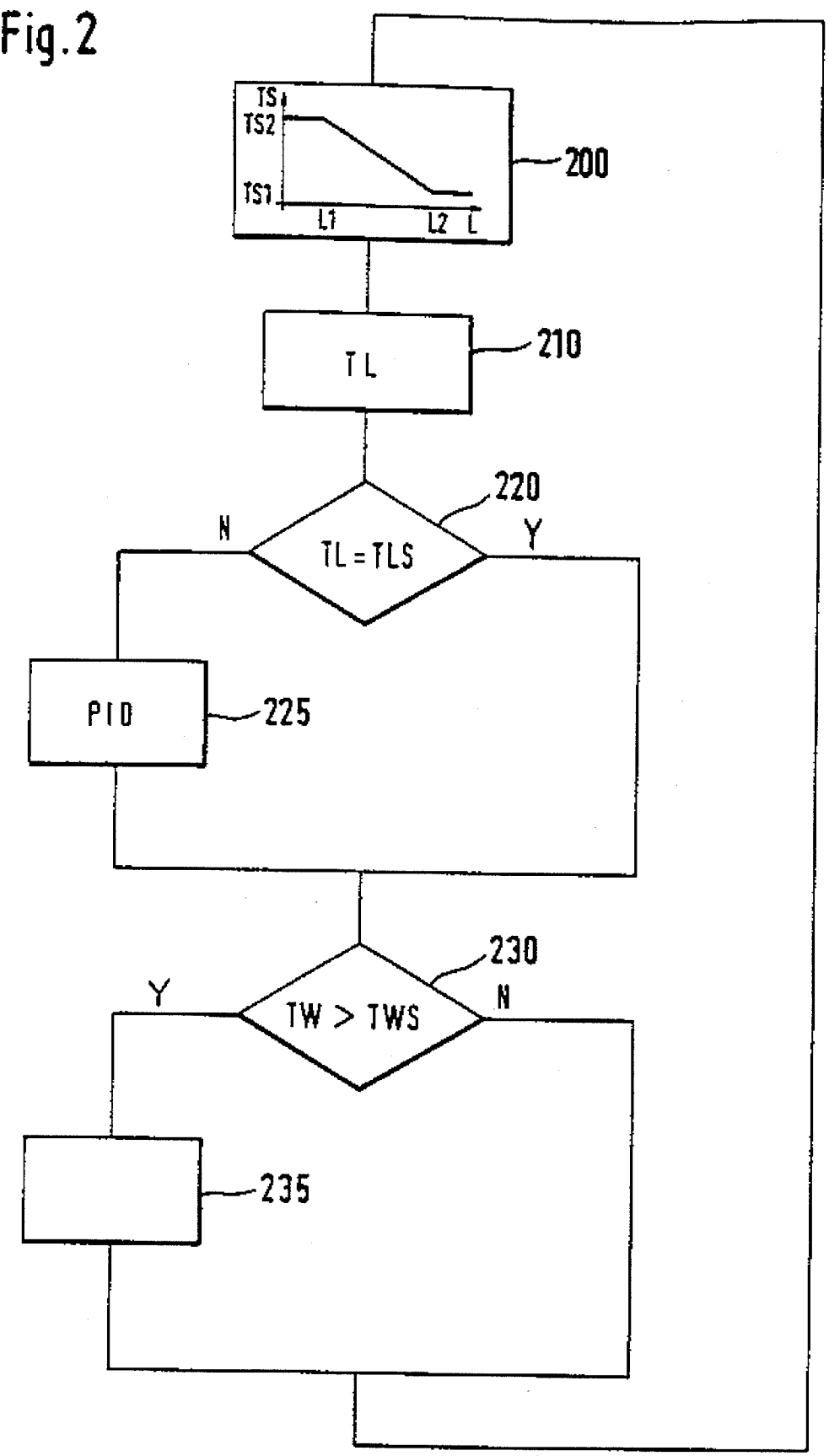
FIG. 2 is a flow chart illustrating the method according to the present invention for controlling an internal combustion engine.

The control of the drive unit 195 will be described in connection with the flow chart of FIG. 2. In a first step 200, a desired value TLS for the supercharger air is pre-established. This pre-established value is established, for instance, as a function of the amount of fuel QK injected or other corresponding values such as, for instance, the duration of the feeding of the fuel.

The predetermination of the desired value TLS for the temperature of the supercharger air is effected, for instance, as follows. With a full load of the internal combustion engine, a supercharger-air temperature of about 40° to 50° C. is pre-established. With zero load up to about 30% of full load, a desired value for the supercharger-air temperature of about 70° to 80° C. is pre-established.

In one particularly advantageous embodiment of the present invention, a value for the supercharger-air temperature is associated with each value of the load. The values for the desired supercharger-air temperature can then be stored in a family of characteristics. Thus, for instance, the desired value of the supercharger-air temperature can be stored as a function of the load.

For example, below a lower value L1 for the load of up to about 25% to 30% of full load, a first value TS2 for the supercharger-air temperature of about 80° C. is selected. Above an upper value L2 for the load, as from about 50% of full load, a second value TS1 for the supercharger-air temperature of about 40° C. is selected. Between the upper and lower load values, the temperature drops linearly from its first value to its second value. In the case of small loads or small amounts of fuel injected, a high supercharger-air temperature is established. In the case of large loads, a low supercharger-air temperature is established.

Thereupon, the actual supercharger-air temperature TL is measured in step 210. If the inquiry 220 shows that the actual supercharger-air temperature TL is in accord with the desired supercharger-air temperature TLS, then this is followed by inquiry 230. If the actual supercharger-air temperature TL differs from the desired value TLS, then, in step 225 a controller forms a control value for controlling the drive unit 195. The controller is preferably developed as PID-controller.

This is followed by the inquiry 230, which checks whether the cooling-water temperature TW is above a predetermined threshold value TWS. If so, then, in step 235, the drive unit 195 is controlled in such a manner that it supplies the maximum possible stream of air. In particular, if the threshold value is exceeded, the fan is driven regardless of the actual supercharger-air temperatures. If the temperature of the cooling water does not exceed the threshold value TWS, the program is started again from the beginning.

As an alternative to establishing a desired value, a fan speed value or a current value for the proportional pressure valve or some other corresponding value can also be established as a function of the load of the internal combustion engine. In such case, the drive unit 195 is controlled as a function of the load.

Instead of the fixed-displacement pump, which is of favorable cost, a variable-displacement pump or a suction-regulated piston pump can also be used as drive unit 195. In principle, drive units which assure a dynamically rapid control of the supercharger-air temperature via the fan of the supercharger air cooler can be employed.

Due to the fact that the control/regulation of the supercharger-air temperature is effected by the control unit 110, there is a considerable reduction in the cost of the entire system. Instead of two control units and two sensors for detecting the supercharger-air temperature and the cooling-water temperature, now only one control unit or one sensor is necessary.

Various advantages result from the fact that the drive unit and thus the fan output is a function of the state of the load of the internal combustion engine. With a full load of the internal combustion engine, a lower supercharger-air temperature can be reached. Due to the lower supercharger-air temperature, an earlier start of injection is possible, and, for the same emission of noxious substances, results in a lower specific consumption of fuel. It is customarily provided that the start of injection is predetermined as a function of the actual supercharger-air temperature TL and other operating parameters.

In FIG. 3, the specific fuel consumption in grams per kilowatt hour is plotted over the supercharger-air temperature. The start of injection in degrees of crankshaft angle (°KW), referred to top dead center (TDC), is also plotted over the supercharger-air temperature in °C.

The possible start of injection as a function of the supercharger-air temperature is shown by the solid line. This start of injection, with constant emission of noxious substances, can be adjusted. With a suitable start of injection and suitable supercharger-air temperature, the specific fuel consumption shown in dashed line can be obtained. If the supercharger-air temperature drops, for instance, from 80° C. to 40° C., then the start of injection can be shifted from 7 degrees crankshaft angle past top dead center to 5 degrees crankshaft angle before top dead center without the emission of noxious substances increasing. In this way, an almost 10% saving of fuel is obtained.

With a lower load, a high supercharger-air temperature of about 80° C. is reached. In this way, lower emissions of hydrocarbons and particles result.

With a high speed of rotation N of the internal combustion engine, low load and a cold engine, blue-smoke and white-smoke emission can be substantially avoided.

What is claimed is:

1. A method for controlling an internal combustion engine having a supercharger and a drive device for controlling a fan for cooling supercharger air, comprising the steps of:

predetermining a desired value of a temperature of the supercharger air as a function of at least one operating parameter of the internal combustion engine;

determining a load value as a function of the at least one operating parameter of the internal combustion engine; and dynamically controlling the drive device as a function of the load value and the desired value.

2. The method according to claim 1, wherein the step of dynamically controlling the drive device includes:

establishing a first temperature of the supercharger air if the load value is higher than a preselected threshold value, and establishing a second temperature of the supercharger air if the load value is lower than the preselected threshold value, the first temperature being lower than the second temperature.

3. A method for controlling an internal combustion engine having a supercharger and a drive device for controlling a fan for cooling supercharger air, comprising the steps of:

determining a load value as a function of at least one operating parameter of the internal combustion engine;

dynamically controlling the drive device as a function of the load value to establish a first temperature of the supercharger air if the load value is higher than a predetermined threshold value and to establish a second temperature of the supercharger air if the load value is lower than the predetermined threshold value, the first temperature being lower than the second temperature;

determining at least one engine control signal as a function of the at least one operating parameter; and providing the at least one engine control signal to a fuel metering device for controlling the internal combustion engine.

4. The method according to claim 3, wherein the at least one operating parameter includes at least one of an accelerator-pedal position, an amount of fuel actually injected, an amount of fuel to be injected, and a duration of fuel feeding.

5. The method according to claim 3, wherein the at least one engine control signal includes one of an amount of fuel to be supplied signal, a start of feed signal, and a start of injection signal.

6. A method for controlling an internal combustion engine having a supercharger, a first cooler for receiving supercharger air, a second cooler for receiving cooling-water and a drive device for controlling a fan for cooling the supercharger air, the method comprising the steps of:

receiving at least one operating parameter of the internal combustion engine in a control unit;

determining a load value as a function of the at least one operating parameter;

determining a desired value for a temperature of the supercharger air as a function of the load value;

determining an actual value of the temperature of the supercharger air; and if the actual value of the temperature of the supercharged air does not correspond to the desired value, forming a control signal in the control unit for controlling the drive unit to operate the fan, thereby adjusting the temperature of the supercharger air to correspond to the desired value.

7. The method according to claim 6, wherein the step of determining the desired value includes:

establishing a first desired value for the temperature of the supercharger air when the load is at least as low as a first threshold value, establishing a second desired value for the temperature of the supercharger air when the load is at least as high as a second threshold value, and establishing a plurality of intermediate desired values for the temperature of the supercharger air when the load is between the first threshold value and the second threshold value, the plurality of intermediate desired values dropping linearly between the first desired value and the second desired value.

8. The method according to claim 7, wherein the first desired value is 80° C. and the second desired value is 40° C.

9. The method according to claim 6, wherein the step of forming the control signal includes forming the control signal via a PID controller.

10. The method according to claim 6, further comprising the steps of:

determining an actual temperature of the cooling-water;

determining whether the actual temperature of the cooling-water exceeds a predetermined value;

if the actual temperature of the cooling water exceeds the predetermined value, controlling the drive unit to operate the fan, thereby cooling the cooling-water; and if the actual temperature of the cooling water does not exceed the predetermined value, returning to the step of determining the load value.

* * * * *